US009004400B2

(12) United States Patent
Certain et al.

(10) Patent No.: US 9,004,400 B2
(45) Date of Patent: Apr. 14, 2015

(54) METHOD OF CONTROLLING A BUOYANCY SYSTEM FOR AN AIRCRAFT, A BUOYANCY SYSTEM IMPLEMENTING SAID METHOD, AND AN AIRCRAFT

(75) Inventors: Bernard Certain, Aix En Provence (FR); Louis Delorme, Marseille (FR); Francois-Xavier Filias, Pelissaanne (FR)

(73) Assignee: Airbus Helicopters, Marignane Cedex (FR)

( * ) Notice: Subject to any disclaimer, the term of this patent is extended or adjusted under 35 U.S.C. 154(b) by 525 days.

(21) Appl. No.: 13/300,704

(22) Filed: Nov. 21, 2011

(65) Prior Publication Data

US 2012/0132741 A1 May 31, 2012

(30) Foreign Application Priority Data

Nov. 25, 2010 (FR) ...................... 10 04587

(51) Int. Cl.
*B64C 25/56* (2006.01)
*B64D 25/18* (2006.01)
*B64C 27/00* (2006.01)

(52) U.S. Cl.
CPC ................ *B64D 25/18* (2013.01); *B64C 25/56* (2013.01); *B64C 27/006* (2013.01)

(58) Field of Classification Search
USPC ...................... 244/100 A, 105, 107
See application file for complete search history.

(56) References Cited

U.S. PATENT DOCUMENTS

| 3,091,782 | A | * | 6/1963 | Sclafani | 244/101 |
| 3,092,853 | A | * | 6/1963 | Owen | 114/69 |
| 4,382,567 | A | * | 5/1983 | Fredericks et al. | 244/107 |
| 4,655,415 | A | * | 4/1987 | Miller et al. | 244/105 |
| 4,676,461 | A | * | 6/1987 | Musselwhite | 244/107 |
| 4,799,907 | A | * | 1/1989 | Jankowiak et al. | 441/42 |
| 5,148,346 | A | * | 9/1992 | Naab et al. | 361/251 |
| 6,347,970 | B1 | * | 2/2002 | Weinel | 441/80 |
| 7,128,629 | B2 | * | 10/2006 | Summers | 441/81 |
| 7,156,033 | B2 | * | 1/2007 | Mears et al. | 114/68 |
| 7,186,158 | B1 | * | 3/2007 | Barber et al. | 441/123 |
| 7,434,600 | B1 | * | 10/2008 | Swierkocki et al. | 141/67 |
| 7,644,739 | B1 | * | 1/2010 | Vezzosi et al. | 141/67 |
| 8,565,981 | B2 | * | 10/2013 | Filias | 701/45 |

(Continued)

FOREIGN PATENT DOCUMENTS

| CA | 2481789 A1 | 4/2005 |
| FR | 1383688 A | 12/1964 |

(Continued)

OTHER PUBLICATIONS

Search Report and Written Opinion; Application No. FR 1004587; dated Aug. 2, 2011.

*Primary Examiner* — Tien Dinh
*Assistant Examiner* — Michael A Fabula
(74) *Attorney, Agent, or Firm* — Brooks Kushman P.C.

(57) ABSTRACT

A buoyancy system (2) includes at least one float (3), a deployment assembly (30) having at least one deployment member (34) for deploying the float (3), an engagement controller (5) which activates the deployment assembly (30), and at least two immersion sensors (20) for issuing an order for automatic deployment of the float (3) to the deployment assembly (30). The deployment assembly (30) is provided with a memory (31) containing a pre-established list of events. The deployment assembly (30) deploys each float (3) when a predetermined event occurs.

16 Claims, 2 Drawing Sheets

(56) References Cited

U.S. PATENT DOCUMENTS

| | | | |
|---|---|---|---|
| 2001/0049241 A1* | 12/2001 | McClure et al. | 441/88 |
| 2002/0123277 A1* | 9/2002 | Weinel | 441/40 |
| 2003/0197599 A1* | 10/2003 | Kim | 340/425.5 |
| 2004/0127118 A1* | 7/2004 | Simmons | 441/89 |
| 2004/0226498 A1* | 11/2004 | Mears et al. | 114/68 |
| 2005/0077426 A1* | 4/2005 | Simard | 244/107 |
| 2006/0016380 A1* | 1/2006 | Braitberg | 114/360 |
| 2008/0268731 A1* | 10/2008 | Lahyani | 441/89 |
| 2009/0173829 A1* | 7/2009 | Hakki et al. | 244/139 |
| 2010/0044507 A1* | 2/2010 | Smith et al. | 244/110 R |
| 2011/0049294 A1* | 3/2011 | Morley et al. | 244/107 |
| 2012/0101666 A1* | 4/2012 | Hill et al. | 701/3 |
| 2012/0312215 A1* | 12/2012 | Lyons | 114/54 |
| 2013/0210297 A1* | 8/2013 | Maas et al. | 441/95 |

FOREIGN PATENT DOCUMENTS

| | | |
|---|---|---|
| WO | 2006046038 A2 | 5/2006 |
| WO | 2008054401 A2 | 5/2008 |

\* cited by examiner

METHOD OF CONTROLLING A BUOYANCY SYSTEM FOR AN AIRCRAFT, A BUOYANCY SYSTEM IMPLEMENTING SAID METHOD, AND AN AIRCRAFT

CROSS REFERENCE TO RELATED APPLICATIONS

This application claims priority to FR 10 04587 filed on Nov. 25, 2010, the disclosure of which is incorporated in its entirety by reference herein.

BACKGROUND OF THE INVENTION (1) Field of the Invention

The present invention relates to the general technical field of safety systems for aircraft, and in particular for aircraft of the rotorcraft kind, e.g. helicopters.

The present invention relates more particularly to an emergency buoyancy system and to its method of control, and also to the associated aircraft. Such an emergency buoyancy system provides an aircraft with buoyancy and stability in the event of ditching in water, so as to allow the occupants to evacuate the aircraft. All aircraft that perform missions of transporting people over areas of sea are, in principle, fitted with such a buoyancy system.

(2) Description of Related Art

An emergency buoyancy system comprises floats that are deployed either under the control of the pilot and/or the copilot, or else that are triggered automatically, in particular by means of an immersion detector. Such floats may comprise bags that are inflated by explosive or electric deployment means, for example.

In present aircraft, an emergency buoyancy system is triggered manually in flight or in the event of the aircraft making contact with or impacting against water. The buoyancy system must previously have been engaged, by using a control button when overflying the sea while simultaneously having a speed of advance that is less than a speed known to be a maximum speed for proper deployment of the float. A pushbutton lights up once the buoyancy system is engaged to indicate that it is ready to operate. So long as the buoyancy system is not engaged, an erroneous operation on the control stick cannot trigger inflation of the floats.

Pressing on the lighted pushbutton or on a pushbutton on the control stick handle enables deployment of the floats to be triggered manually.

If the crew is unable to actuate the buoyancy system manually, deployment of the floats is triggered automatically by the immersion detector.

Document WO 2008/054401 discloses a system for inflating anticrash airbags, while taking account of the attitude of the aircraft and an excessive speed of descent.

Document U.S. Pat. No. 7,156,033 B2 discloses a buoyancy system associated with inhibitor means.

Document FR 1 383 688 discloses a helicopter having inflatable floats.

Document CA 2 481 789 suggests using an immersion sensor associated with an acceleration sensor in order to trigger the inflation of a float.

Known emergency buoyancy systems are advantageous. Nevertheless, untimely and undesired inflation of floats can occur in flight, e.g. because of very wet conditions. Untimely deployment of the floats takes the aircraft out of service in unwanted manner, at very least for the purpose of verifying the emergency buoyancy system.

BRIEF SUMMARY OF THE INVENTION

The object of the present invention is to provide a novel method of controlling an emergency buoyancy system that limits or even eliminates any risk of untimely triggering, and also to provide an emergency buoyancy system and the associated aircraft.

An object of the present invention is thus to provide a device that enables the above-mentioned limitations to be overcome.

The invention thus provides a method of controlling a buoyancy system for an aircraft, the buoyancy system having at least one float and deployment means for deploying the float, such as deployment means including a deployment member for deploying at least one float by inflating it for example. The buoyancy system includes engagement means for activating the deployment means of the float, the buoyancy system including at least two immersion sensors for issuing an order for automatic deployment of said float to the deployment means.

According to the method, the deployment means deploy each float when firstly the engagement means activate the deployment means and secondly there occurs an event that is contained in a pre-established list of events, the list comprising at least the following events:

both of the immersion sensors signal immersion to the deployment means by sending the deployment order thereto; and the deployment means remain activated at the end of a predetermined time period, the predetermined time period running from the time a single immersion sensor signals immersion by sending said deployment order.

Thus, each float can be deployed in order to provide the aircraft with buoyancy only when the engagement means have been voluntarily acted upon by a person, e.g. a pilot.

Furthermore, care is taken to ensure that the deployment order received by the deployment means has not been issued unduly.

Thus, automatic deployment of the float(s) takes place immediately, only if the deployment order was given by at least two immersion sensors. The invention does not merely suggest having redundant immersion sensors in order to mitigate failure of an immersion sensor, but rather takes the view that deployment should not be undertaken unless two immersion sensors are both signaling immersion, with deployment being at very least delayed if only one immersion sensor is signaling immersion.

If only one immersion sensor is signaling immersion, it might be that the sensor giving the deployment order is faulty. Under such circumstances, the deployment of the float(s) does not become effective until the end of the predetermined time period, thereby giving the pilot the opportunity to cancel the deployment order, for example.

A deployment order may be canceled by disengaging the deployment means, by operating the engagement means for that purpose.

Consequently, the invention limits or even eliminates any risk of a float being deployed in untimely manner, with a float being deployed only in limited circumstances.

The method may also include one or more of the following characteristics.

For example, the buoyancy system may optionally include manual means for giving a float-deployment order to the deployment means on manual request of a person, and at least two immersion sensors for giving an automatic order for deploying said float to the deployment means.

The deployment means may then deploy each float when firstly the engagement means have activated the deployment means and secondly there has occurred an event that is contained in a pre-established list of events, which list comprises all of the following events:

a person operates the manual means repeatedly to send the deployment order some number of times greater than or equal to a predetermined threshold, the threshold being greater than unity;

the deployment means remain activated at the end of a predetermined time period, the predetermined time period running from the time a person operates the manual means to send said deployment order some number of times that is less than the threshold;

both immersion sensors signal immersion to the deployment means by sending the deployment order thereto; and the deployment means remain activated at the end of a predetermined time period, the predetermined time period running from the time a single immersion sensor signals immersion by sending said deployment order.

It thus becomes possible to deploy each float manually by using the manual means, e.g. a control button arranged on the control stick. Deployment takes place immediately if the deployment order is repeated, i.e. if the person operates the manual means some number of times that is greater than or equal to a threshold.

Otherwise, the deployment of each float becomes effective only at the end of a predetermined time period, so as to leave the pilot the option of canceling the deployment order, for example.

For example, the threshold is optionally equal to 3. This threshold value serves to guarantee that the pilot operated the manual means deliberately, while avoiding too great a number of operations of said manual means.

Similarly, the predetermined time period is optionally equal to ten seconds. Under such circumstances, the predetermined time period leaves enough time for a person to react, but without that reaction time being harmful in the event that an incident has actually occurred.

Advantageously, the engagement means are operated to activate the deployment means when the aircraft is overflying an extent of water. This can guarantee for example that a float is not deployed when the aircraft is on the ground.

Furthermore, when the deployment means receive a deployment order coming from an immersion sensor or from manual means, if the engagement means are not activating the deployment means, then the order is signaled to a person and said at least one float is not deployed.

The person then observes either a fault of the buoyancy system, or that the manual means have been operated unduly.

In another aspect, the engagement means activating the deployment means, when the deployment means receive a deployment order coming from a single immersion sensor or from manual means operated some number of times that is less than a threshold, where appropriate, said order is signaled to a person.

Thus, the person is warned that a deployment order is about to be given, but before that deployment becomes effective, i.e. before the end of the predetermined time period. If the order is inappropriate, the person can disengage the deployment means and thus avoid unwanted deployment.

In a first variant, each float is deployed automatically once the predetermined time period has elapsed.

In a second variant, when the deployment means receive an order to deploy each float coming from a single immersion sensor or from manual means operated some number of times that is less than a threshold, where appropriate, at the end of the predetermined time period, the deployment means:

deploy each float if the aircraft is in a predetermined flight domain as defined by the height and the forward speed of the aircraft; and do not deploy the at least one float if the aircraft is not in the predetermined flight domain.

Consequently, the deployment of each float is restricted to the predetermined flight domain only when the deployment order is not confirmed by repeated use of the manual means or by two immersion sensors being activated. Outside the predetermined flight domain, each float can be deployed only by repeated use of the manual means or by two immersion sensors being activated.

The term "height" is used to mean the shortest distance between the aircraft and the surface being overflown by the aircraft.

Said predetermined flight domain comprises at least:

a first zone defined by a forward speed of the aircraft lying between a maximum speed and an intermediate speed that is less than the maximum speed, and by a height that is less than a maximum height; and a second zone defined by a forward speed of the aircraft less than said intermediate speed, and by a height less than an intermediate height that is less than the maximum height.

In addition, the predetermined flight domain may also include a third zone defined by a forward speed less than the intermediate speed, and by a height that is less than a threshold height. The threshold height is represented by a segment in a diagram having forward speed plotted along the abscissa and height plotted up the ordinate, the segment starting from a first point to reach a second point, the first point having a zero forward speed as its abscissa and the intermediate height as its ordinate in the diagram, the second point having the intermediate speed as its abscissa and having the maximum height as its ordinate in the diagram.

In another aspect, any deployment order is stored in memory, in particular for maintenance purposes, with the deployment order being given by the manual means, where appropriate, or by an immersion sensor.

In addition to a method, the invention provides a buoyancy system that implements the method.

Such an aircraft buoyancy system comprises at least one float and deployment means for deploying the float, the buoyancy system having engagement means for activating the deployment means of the float, the buoyancy system including at least two immersion sensors for issuing an order for automatic deployment of the float to the deployment means.

The buoyancy system is, in particular, remarkable in that said engagement means are activated only manually and not in compliance with monitoring parameters of the speed and height type, the deployment means being provided with a memory containing a pre-established list of events, the deployment means deploying each float when one of said events occurs, the deployment means including timer means for deploying each float after a time delay when said deployment means receive a deployment order for each float coming from a single immersion sensor, said list comprising at least the following events:

both of said immersion sensors signal immersion to the deployment means by sending said deployment order thereto; and the deployment means remain activated at the end of a predetermined time period, said predetermined time period running from the time a single immersion sensor signals immersion by sending said deployment order.

This buoyancy system implements the method of the invention by being provided with engagement means that can be operated only manually and with a memory for storing a short list of the above-described type of events that are suitable for triggering each float.

The buoyancy system may include one or more of the following characteristics.

In a variant, said buoyancy system has manual means for giving an order to deploy the float to the deployment means on manual request from a person, the timer means delaying the deployment of each float when the deployment means receive a deployment order for each float coming from a single immersion sensor or from manual means operated some number of times that is less than a predetermined threshold, said list comprising the following events:
- both of said immersion sensors signal immersion to the deployment means by sending said deployment order thereto;
- the deployment means remain activated at the end of a predetermined time period, said predetermined time period running from the time a single immersion sensor signals immersion by sending said deployment order;
- a person operates said manual means repeatedly to send said deployment order some number of times greater than or equal to a predetermined threshold, said threshold being greater than unity; and
- the deployment means remain activated at the end of a predetermined time period, said predetermined time period running from the time a person operates said manual means to send said deployment order some number of times that is less than said threshold.

The buoyancy system may also include visual or audible signaling means for signaling to a person the presence of a deployment order for each float reaching the deployment means, the signaling means co-operating with the deployment means. The deployment means may then order the signaling means to issue an audible or visual signal on receiving an order to deploy each float.

Furthermore, the buoyancy system may include first measurement means for measuring the height of the aircraft and second measurement means for measuring the forward speed of the aircraft and co-operating with the deployment means, the deployment means preventing deployment of said at least one float:
- when the deployment means receive an order to deploy each float coming from a single immersion sensor or, where appropriate, from manual means operated some number of times less than a predetermined threshold; and
- when the aircraft lies outside a predetermined flight domain defined by the height and the forward speed of the aircraft.

If the deployment order was sent by manual means operated some number of times greater than or equal to a predetermined threshold or by two immersion sensors, then, on the contrary, each float is deployed without waiting.

Finally, the invention provides an aircraft having a buoyancy system of the type described above.

BRIEF DESCRIPTION OF SEVERAL VIEWS OF THE DRAWINGS

The invention and its advantages appear in greater detail from the context of the following description of embodiments given by way of illustration and with reference to the accompanying figures, in which:

FIG. 1 represents an aircraft 1 having a buoyancy system 2.

DETAILED DESCRIPTION OF THE INVENTION

Figure 1:
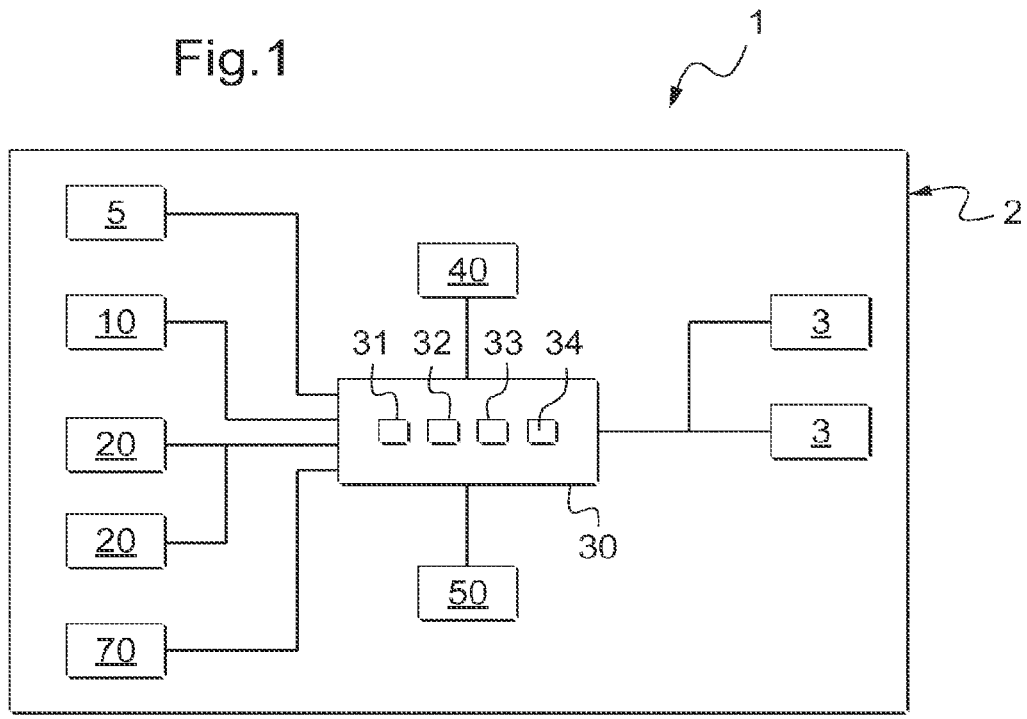
FIG. 1 is a diagram representing an aircraft of the invention.

The buoyancy system 2 comprises at least one float 3 providing the aircraft 1 with buoyancy when landing on water, e.g. prior art floats 3. FIG. 1 shows two floats, nevertheless the buoyancy system 2 could be provided with only one float or indeed with a number of floats greater than two.

In a buoyancy system 2 that is provided with deployment means 30 for deploying the floats 3, where appropriate, the deployment means 30 need to have at least one deployment member 34 for deploying the floats. In a variant, the floats 3 are floats that are inflatable by the deployment member 34 of the deployment means 30, where appropriate.

Reference may be made to the state of the art in order to find examples of floats and of members for deploying such floats.

Furthermore, the buoyancy system 30 includes engagement means 5 for activating the deployment means. By way of example, the engagement means 5 may be controlled solely by a person, and not as a function of monitoring parameters of the aircraft. When the engagement means 5 are engaged (made ready) by such a person, an occupant of the aircraft such as a pilot, the deployment means 30 are capable of deploying each float 3, whereas conversely deployment of the floats is prevented when the engagement means 5 are not engaged.

Advantageously, the engagement means are engaged solely when overflying an extent of water.

In addition to engagement means 5 suitable for activating the deployment means 30, e.g. by powering them electrically, the buoyancy system is provided with trigger means for giving a deployment order to the deployment means 30. Consequently, the function of the engagement means 5 is to activate the deployment means, while the function of the trigger means is to actually order deployment of the floats.

The trigger means comprise automatic means connected to the deployment means 30 in order to give a deployment order to the deployment means 30. Such automatic means include at least two immersion sensors 20 for detecting immersion of the aircraft.

The trigger means may also include manual means 10 connected to the deployment means, with a person manually operating the manual means in order to give a deployment order to the deployment means 30.

Deployment of the floats 3 becomes effective when firstly the engagement means 5 have activated the deployment means 30, and secondly a deployment order has occurred relating to an event that is contained in a pre-established list.

Consequently, the deployment means contain in particular a memory 31 storing information associated with said events, and control means 33, e.g. of the processor type. The control means 33 verify in real time whether the events programmed in the memory are occurring and they order the deployment member 34 to deploy the floats, where appropriate.

Depending on the method that is applied, said list comprises at least:
- an event relating to a confirmed deployment order, such as a deployment order coming from two immersion sensors, or if any coming from manual means that have been operated some number of times greater than or equal to a threshold; and an event relating to a non-confirmed deployment order, such as a deployment order coming from a single immersion sensor, or if any coming from manual means operated some number of times that is less than said threshold.

An event corresponding to a confirmed deployment order leads to the float being deployed immediately, whereas an event corresponding to a non-confirmed deployment order leads to the float being deployed after a time delay.

Thus, the list comprises at least:

a first event in which two immersion sensors 20 indicate immersion to the deployment means by each of them sending a deployment order thereto; and a second event in which the deployment means 30 remain activated at the end of a predetermined time period, said predetermined time period elapsing as a result of a single immersion sensor 20 indicating immersion by sending a deployment order.

Furthermore, depending on the variant, the list may also comprise:

a third event whereby a person operates the manual means 10 repeatedly so as to send deployment orders, doing so some number of times that is greater than or equal to a predetermined threshold, which threshold is greater than unity and is optionally equal to 3; and a fourth event in which the deployment means 30 remain activated at the end of a predetermined time period, of the order of ten seconds, said predetermined time period elapsing once a person has operated the manual means 10 to send deployment orders, by operating said means some number of times that is less than the predetermined threshold.

In the first event and the third event, the deployment means require floats to be deployed immediately on the deployment order being confirmed.

Furthermore, the deployment means 30 include timer means 32 for delaying the deployment of the floats. The timer means may be a program called on by the control means 33.

Under such circumstances, in the second event or the fourth event, the timer means 32 authorize deployment of the floats 3 at the end of the predetermined time period following a non-confirmed deployment order.

In an option, the buoyancy system includes signaling means 70 connected to the deployment means 30. When the deployment means 30 receive a deployment order, the deployment means 30 operate the signaling means 70 to inform the occupant of the aircraft that a deployment order is present. The signaling means 70 may be of the visible or audible type, e.g. a visual alarm of the type presenting an amber color.

If the deployment order was launched in the context of the second event and the fourth event, and if the occupant does not desire to request deployment of the floats, then that person can disengage the deployment means 30 by using the engagement means 5.

Thus, when the deployment means 30 receive a deployment order from an immersion sensor 20 or from the manual means 10, where appropriate, said order is signaled to a person, but the floats 3 are not deployed if the engagement means 5 do not engage the deployment means 30.

When the deployment means 30 receive a deployment order coming from a single immersion sensor 20 or from manual means 10 operated some number of times less than said threshold in accordance with the second event and the fourth event as mentioned above, then the deployment order is signaled to at least one occupant of the aircraft and the time delay is started if the engagement means 5 are activating the deployment means 30.

In a variant, at the end of the predetermined time period, the deployment means 30 order deployment of the floats 3.

In another variant, the buoyancy system 2 has first measurement means 40 for measuring the height H of the aircraft 1, e.g. using a radio altimeter, and second measurement means 50 for measuring the forward speed V of the aircraft 1.

If the deployment means 30 receive an order to deploy the floats 3 from a single immersion sensor 20 or from manual means 10 that are operated some number of times that is less than the threshold, then at the end of the predetermined time period the deployment means 30 deploy the floats 3 providing the aircraft 1 lies in a predetermined flight domain defined by the height H and the forward speed V of the aircraft 1.

Figure 2:
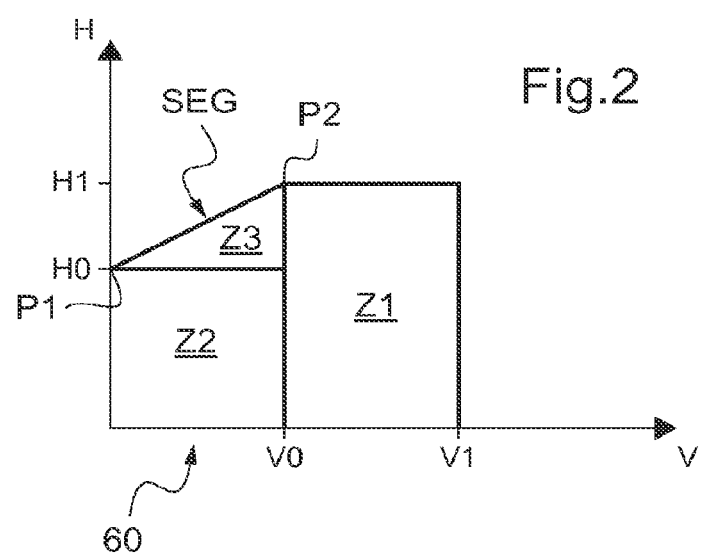
FIG. 2 is a diagram representing a flight domain of the invention.

With reference to FIG. 2, the predetermined flight domain 60 comprises at least:

a first zone Z1 defined by a forward speed V lying between a maximum speed V1 and an intermediate speed V0 that is less than the maximum speed V1, and at a height H that is less than a maximum height H1; and a second zone Z2 defined by a forward speed V that is less than the intermediate speed V0, and by a height H that is less than an intermediate height H0 itself less than the maximum height H1.

Furthermore, in a variant, the predetermined flight domain 60 also includes a third zone Z3 defined by a forward speed V that is less than the intermediate speed V0 and by a height H that is less than a threshold height.

This threshold height varies linearly as a function of the forward speed. Under such circumstances, it is represented by a segment SEG in a diagram plotting forward speed V along the abscissa and height H up the ordinate, with the segment SEG starting from a first point P1 and reaching a second point P2, the first point P1 in the diagram having a speed of advance position of zero along the abscissa, and an intermediate height H0 up the ordinate, while the second point P2 in the diagram has an intermediate speed of advance V0 along the abscissa and the maximum height H1 up the ordinate.

Figure 3:
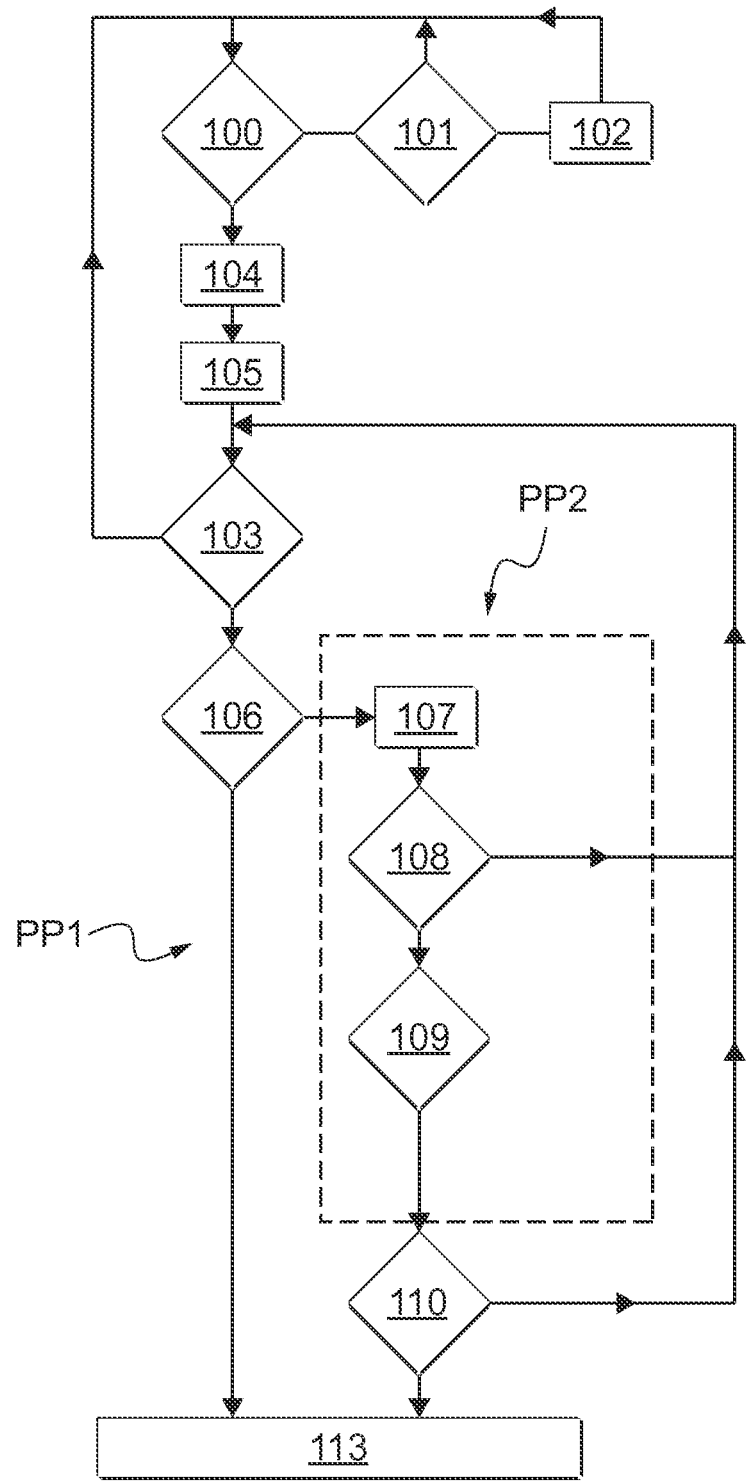
FIG. 3 is a flow chart explaining the method in a preferred variant of the invention.

FIG. 3 explains the various steps of a preferred variant of the method of the invention.

In a first step 100, the deployment means act in real time to monitor the arrival of a deployment order, independently of the nature of the deployment order.

In the absence of such a deployment order, and during a verification step 101, the deployment means verify whether the signaling means 70 are activated. If the signaling means are signaling the presence of a deployment order, then during a correction step 102 the deployment means order the signaling means to cease signaling the presence of such a deployment order.

If a deployment order has been received, then during a memory storage step 104, the deployment order is stored for maintenance purposes in a memory provided specifically for this purpose or indeed in the memory 31 of the deployment means 30, for example.

Furthermore, during a signaling step 105, the deployment means 30 order the signaling means to signal the deployment order to the occupants of the aircraft.

During a test step 103, it is verified whether the engagement means 5 have been activated. If not, the floats 3 are not deployed.

Conversely, if the engagement means 5 have activated the deployment means 30, then during a step 106 the nature of the event that has given rise to the deployment order is determined.

When the deployment means 30 have been called upon by a person operating the manual means 10, if any, some number of times greater than or equal to a predetermined threshold, or by two immersion sensors 20, then the deployment means request immediate deployment of the floats during a deployment step 113 using a first procedure PP1.

In contrast, when the deployment means 30 have been called upon by a person operating the manual means 10, if any, by operating them some number of times that is less than a predetermined threshold, or by only one immersion sensor 20, then a second procedure PP2 is implemented seeking to deploy after a time delay has elapsed.

During a time delay step 107, the timer means 32 measure elapsing time as from the moment the deployment order was received.

During a step 108 of studying the situation of the aircraft, it is determined whether the aircraft is in the predetermined flight domain.

If not, the only way of causing the float to be deployed is by means of the first procedure PP1, i.e. by operating the manual means 10 some number of times greater than or equal to a predetermined threshold or by two immersion sensors 20 being immersed.

If the aircraft is in the predetermined flight domain, it is possible to trigger an audible alarm in order to warn the occupants of the aircraft in a step 109 that deployment of the floats is imminent.

Furthermore, if the occupants desire not to trigger deployment of the floats 3, then during a step 110, which may take place at any time during the second procedure PP2, the occupants may act on the engagement means 5 in order to interrupt the deployment procedure.

At the end of a predetermined period of time, the deployment means require the floats to be deployed during the deployment step 113.

Naturally, the present invention may be subjected to numerous variants as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A method of controlling a buoyancy system for an aircraft, the method comprising the steps of:
   providing in said buoyancy system at least one float and a deployment means having at least one deployment member for deploying said float,
   providing in said buoyancy system an engagement means which activates and deactivates the deployment means of said float,
   providing in said buoyancy system at least two immersion sensors for issuing an order for automatic deployment of said float to the deployment means, during which said deployment means deploy each float when firstly the engagement means activate the deployment means and secondly there occurs an event that is contained in a pre-established list of events, said list including at least the following events:
   at least two of said immersion sensors signal immersion to the deployment means by sending said deployment order thereto; and
   the deployment means remain activated at the end of a predetermined time period, said predetermined time period running from the time a single immersion sensor signals immersion by sending said deployment order;
   engaging the engagement means to activate the deployment means;
   detecting an event from the pre-established list of events; and
   deploying the at least one float after detecting the event while the deployment means are activated.

2. A method according to claim 1, wherein said buoyancy system has a manual means which gives an order to deploy said float to the deployment means on manual request of a person, and said list further comprises the following events:
   said manual means is repeatedly operated to send said deployment order some number of times greater than or equal to a predetermined threshold, said threshold being greater than one; and
   the deployment means remain activated at the end of a predetermined time period, said predetermined time period running from the time said manual means is operated to send said deployment order some number of times that is less than said threshold.

3. A method according to claim 2, wherein said threshold is equal to 3.

4. A method according to claim 1, wherein said predetermined time period is equal to ten seconds.

5. A method according to claim 1, wherein the engagement means are operated to activate the deployment means when the aircraft is overflying an extent of water.

6. A method according to claim 2, wherein when the deployment means receive a deployment order coming from an immersion sensor or from the manual means, if the engagement means are not activating the deployment means, then said order is signaled to a person via a signaling means and said at least one float is not deployed.

7. A method according to claim 2, wherein when the deployment means receive a deployment order coming from a single immersion sensor or from the manual means operated some number of times that is less than said threshold, the order is signaled to a person via a signaling means.

8. A method according to claim 2, further comprising the steps of:
   providing a first measurement means for measuring height (H) of the aircraft;
   providing a second measurement means for measuring forward speed (V) of the aircraft;
   determining the height (H) of the aircraft via the first measurement means; and
   determining the forward speed (V) of the aircraft via the second measurement means;
   wherein when the deployment means receive an order to deploy each float coming from a single immersion sensor or from the manual means operated some number of times that is less than a threshold, at the end of either of the predetermined time periods, the deployment means:
   deploy each float if the aircraft is in a predetermined flight domain as defined by the height (H) and the forward speed (V) of the aircraft; and
   do not deploy said at least one float if the aircraft is not in said predetermined flight domain.

9. A method according to claim 8, wherein said predetermined flight domain comprises at least:
   a first zone (Z1) defined by a forward speed (V) lying between a maximum speed (V1) and an intermediate speed (V0) that is less than the maximum speed (V1), and by a height (H) that is less than a maximum height (H1); and a second zone (Z2) defined by a forward speed (V) less than said intermediate speed (V0), and by a height (H) less than an intermediate height (H0) that is less than the maximum height (H1).

10. A method according to claim 9, wherein said predetermined flight domain includes a third zone (Z3) defined by a forward speed (V) less than said intermediate speed (V0), and by a height (H) that is less than a threshold height, said threshold height being represented by a segment (SEG) in a diagram having forward speed (V) plotted along the abscissa and height (H) plotted up the ordinate, the segment (SEG) starting from a first point (P1) to reach a second point (P2), said first point (P1) having a zero forward speed (V) as its abscissa and said intermediate height (H0) as its ordinate in said diagram, said second point (P2) having said intermediate speed (V0) as its abscissa and having said maximum height (H1) as its ordinate in said diagram.

11. A method according to claim 1, further comprising the steps of:
providing the deployment means with a memory; and
storing deployment orders in the memory of the deployment means.

12. A buoyancy system for an aircraft, said buoyancy system comprising:
at least one float,
a deployment means having at least one deployment member for deploying said float,
an engagement means which activates and deactivates the deployment means of said float, and
at least two immersion sensors for issuing an order for automatic deployment of said float to the deployment means,
wherein said engagement means is configured to activate and deactivate the deployment means, said deployment means being provided with a memory containing a pre-established list of events, said deployment means deploying each float when one of said events occurs while the deployment means is activated, said deployment means including a timer configured to deploy each float after a time delay when said deployment means receive a deployment order for each float coming from a single immersion sensor while the deployment means is activated, said list including at least the following events:
at least two of said immersion sensors signal immersion to the deployment means by sending said deployment order thereto; and
the deployment means remain activated at the end of a predetermined time period, said predetermined time period running from the time a single immersion sensor signals immersion by sending said deployment order.

13. A buoyancy system according to claim 12, wherein said buoyancy system has a manual means which gives an order to deploy said float to the deployment means on manual request from a person, the timer means delaying the deployment of each float when the deployment means receive a deployment order for each float coming from a single immersion sensor or from the manual means operated some number of times that is less than a predetermined threshold, said list further comprising the following events:
said manual means is repeatedly operated to send said deployment order some number of times greater than or equal to a predetermined threshold, said threshold being greater than one; and
the deployment means remain activated at the end of a predetermined time period, said predetermined time period running from the time said manual means is operated to send said deployment order some number of times that is less than said threshold.

14. A buoyancy system according to claim 12, including a signaling means for signaling to a person the presence of a deployment order for each float reaching said deployment means, said signaling means co-operating with said deployment means.

15. A buoyancy system according to claim 13, including:
a first measurement means for measuring the height (H) of said aircraft, and
a second measurement means for measuring the forward speed (V) of said aircraft,
wherein the first and second measurement means cooperate with said deployment means to prevent deployment of each float:
when the deployment means receive an order to deploy each float coming from a single immersion sensor or from the manual means operated some number of times less than a predetermined threshold; and
when the aircraft lies outside a predetermined flight domain defined by the height (H) and the forward speed (V) of the aircraft.

16. An aircraft, comprising:
a buoyancy system including:
at least one float,
a deployment means having at least one deployment member for deploying said float,
an engagement means which activates and deactivates the deployment means, and
at least two immersion sensors for issuing an order for automatic deployment of said float to the deployment means,
wherein said engagement means is configured to activate and deactivate the deployment means, said deployment means being provided with a memory containing a pre-established list of events, said deployment means deploying each float when one of said events occurs while the deployment means is activated, said deployment means including a timer configured to deploy each float after a time delay when said deployment means receive a deployment order for each float coming from a single immersion sensor while the deployment means is activated, said list including at least the following events:
at least two of said immersion sensors signal immersion to the deployment means by sending said deployment order thereto; and
the deployment means remain activated at the end of a predetermined time period, said predetermined time period running from the time a single immersion sensor signals immersion by sending said deployment order.

* * * * *